United States Patent [19]
Jachmann et al.

[11] Patent Number: 4,722,077
[45] Date of Patent: Jan. 26, 1988

[54] TRANSCRIPTION CONTROL OVER PLURAL INTERCONNECTED MODULES

[75] Inventors: Emil F. Jachmann, Greenwich; Robert L. Rubenstein, Norwalk; Joseph A. Howells, Brookfield Center, all of Conn.

[73] Assignee: Dictaphone Corporation, Rye, N.Y.

[21] Appl. No.: 799,909

[22] Filed: Nov. 20, 1985

Related U.S. Application Data

[63] Continuation-in-part of Ser. No. 771,298, Aug. 30, 1985.

[51] Int. Cl.[4] .................. H04M 1/64; G11B 19/00
[52] U.S. Cl. ............................ 369/25; 369/29; 379/75
[58] Field of Search ............. 360/15; 179/6.09, 6.13; 369/24–29; 379/75, 79

[56] References Cited

U.S. PATENT DOCUMENTS

| | | | |
|---|---|---|---|
| 2,581,144 | 1/1952 | Roberts | 369/29 |
| 2,784,258 | 3/1957 | Sharpe | 369/29 |
| 2,799,733 | 7/1957 | La Forest et al. | 369/25 |
| 3,418,432 | 12/1964 | Boggs, Jr. et al. | 369/26 |
| 3,527,891 | 9/1970 | Johnston | 179/6.09 |
| 4,113,994 | 9/1978 | Bolick, Jr. et al. | 179/6.09 |
| 4,543,618 | 9/1985 | Sato | 360/15 |
| 4,604,689 | 8/1986 | Burger | 364/200 |

*Primary Examiner*—Raymond F. Cardillo
*Assistant Examiner*—James E. Tomassini
*Attorney, Agent, or Firm*—Robert H. Whisker; Melvin J. Scolnick; David E. Pitchenik

[57] ABSTRACT

Dictate/transcribe apparatus in which plural modules, each including at least two record/playback decks, are interconnected. A switch in each module selects one or the other or neither of the decks therein to operate in a transcribe mode; and a transducer and operation selector are connected to one of the modules to effect a transcribe operation from the deck which has been selected to operate in the transcribe mode regardless of the particular module in which that deck is located. The electrical coupling arrangement between the modules permits audio signals to be transmitted from the transcribe deck to the particular module to which the transducer and operation selector are connected, and also allows function control signals to be transmitted from the operation selector to the module which includes the transcribe deck.

10 Claims, 2 Drawing Figures

TRANSCRIPTION CONTROL OVER PLURAL INTERCONNECTED MODULES

This is a Continuation-in-Part of copending application Ser. No. 771,298, filed Aug. 30, 1985.

BACKGROUND OF THE INVENTION

This invention relates to dictate/transcribe apparatus comprised of plural modules in which record/playback decks are provided and, more particularly, to such apparatus in which transcription devices (such as a foot pedal switch and a headset) are used to recover messages that had been recorded on any deck in any module, irrespective of the particular module to which those devices are connected.

Historically, dictation systems have been categorized as desk-top dictating machines, central dictation systems or portable dictating devices. A typical desk-top dictating machine is provided with a record medium, typically magnetic tape contained in a cartridge housing such as a standard cassette, a minicassette, a microcassette, or the recently introduced picocassette described in U.S. Pat. No. 4,443,827 and assigned to the assignee of the present invention. Connected to the desk-top dictating machine is a microphone unit having hand controls by which the use of the machine records dictation and controls movement of the record medium for the purpose of reviewing dictation or rapidly advancing the record medium to a desired location. Other conventional controls normally associated with the operation of a dictating machine also are provided.

After dictation is completed, transcription thereof requires the transfer of the record medium (or tape cassette) from the dictating machine to a transcribing machine which must be compatible with each other (e.g. they must accept the same type of record medium and operate at the same record/playback speed). Typically, the transcriptionist is provided with a headset and foot pedal switches which are connected either directly to the transcribing machine, or by so-called private wire connections, or by telephone connection.

As mentioned above, when using desk-top dictating/transcribing machines, the record medium must be removed from one machine and loaded into the other. If the respective machines are disposed at significantly spaced apart locations, such as in different offices or on different floors of an office building, this transfer of record media is a substantial inconvenience, results in inefficient office operation and may be accompanied by loss or misplacement of the record media. Even if the respective machines are located in close proximity, such as in adjacent offices, the requisite transfer of record media still may result in marked reduction in office operation efficiency.

Central dictation systems, as are commercially available, avoid several of the aforenoted disadvantages attendant desk-top dictating/transcribing machines. For example, in one type of central dictation system, a central recorder is provided with an endless loop of magnetic tape and includes a dictate site and a separate transcribe site, both of which may be operated simultaneously, as described in U.S. Pat. No. 3,934,774. While such a central recorder avoids the need to transfer a record medium from a dictating machine to a transcribing machine, such central recorders generally are most efficient when used with several dictators having access to the recorder from several dictate stations. Such a central dictation system is relatively expensive and might not be cost efficient for office operation in which the system is utilized by a relatively small number of dictators and transcriptionists.

Another type of central dictation system that might be utilized more efficiently in a "small office" environment, is described in U.S. Pat. No. 4,071,857 and also in copending application Ser. No. 629,212. These systems are provided with a central recorder which operates to record dictation on individual tape cassettes, a used cassette being replaced by a fresh one to permit transcription of the used cassette and to allow further dictation on the new cassette. While such a central recorder having automatic cassette-changing capabilities reduces the amount of cassette manipulation that is attendant the aforementioned desk-top dictating/transcribing machines, there is, nonetheless, a need to load a used cassette into a separate transcribing machine to facilitate the transcription of recorded dictation.

Therefore, there is a need for an efficient dictation system for use in a so-called small office environment that minimizes the necessity to transfer a record medium from a dictating machine to a transcribing machine, yet is capable of being accessed by several dictators while allowing a transcriptionist to transcribe dictation that has been recorded by any of those dictators. Although prior art systems have been proposed in an attempt to address the small office environment, those systems do not offer sufficient flexibility. For example, one such prior art system contemplates the use of separate dictating and transcribing units mounted in side-by-side relation, with one unit being permanently designated the dictating unit and the other being permanently designated the transcribing unit. Transcription still requires the transfer of a record medium from the dictating unit to the transcribing unit. Furthermore, use of this system to record dictation simultaneously from more than one dictator on different record media, or cassettes, is difficult if not impossible.

The prior art also has proposed a "network" of separate dictating units, each of which may be separately connected to a respective dictator. To avoid record medium transfer for transcription, the usual transcribe apparatus comprised of foot pedal and headset is connected to the desired unit. Unfortunately, this requires the physical connection and disconnection of the transcribe apparatus from one unit to the next; which is time-consuming and annoying.

OBJECTS OF THE INVENTION

Therefore, it is an object of the present invention to avoid the aforenoted disadvantages attending desk-top dictating/transcribing machines and central dictation systems.

Another object of this invention is to provide an efficient, inexpensive dictation system that is particularly adapted for use in a small office environment.

A further object of this invention is to provide such a dictation system in which the transfer of a record medium from a dictate unit to a transcribe unit is minimized if not obviated.

An additional object of this invention is to provide a dictation system that is relatively flexible and may be expanded to permit several dictators to dictate simultaneously on respective record media while allowing a transcriptionist to transcribe the message that had been recorded on any of those media.

Yet another object of this invention is to provide a dictation system comprised of plural modules, each having at least two record/playback decks, and in which transcribe apparatus, such as a foot pedal switch and a headset, may be used to recover messages from any deck in any module, irrespective of the particular module to which that apparatus is physically connected.

A still further object of this invention is to provide a system in which the aforementioned modules are coupled together and an electrical coupling arrangement couples transcribe apparatus that is connected to a particular module to the deck in any module which has been selected as a transcription unit, without requiring any physical reconnection of that apparatus.

Various other objects, advantages and features of the present invention will become readily apparent from the ensuing detailed description, and the novel features will be particularly pointed out in the appended claims.

SUMMARY OF THE INVENTION

In accordance with this invention, dictate/transcribe apparatus is provided with plural intercoupled modules, each module including at least two record/playback decks and a switch operable to select one or the other or neither of those decks to operate in a transcribe mode. Transcribe apparatus, such as a transducer and an operation selector (preferably in the form of a foot pedal switch) are connected to one of the intercoupled modules. An electrical coupling arrangement couples that one module to at least the module which includes the deck that has been selected to operate in the transcribe mode. Accordingly, audio signals are transmitted from the transcribe deck through the electrical coupling arrangement to the one module to which the transcribe apparatus is connected, and function control signals are transmitted from the transcribe apparatus to that one module and thence through the electrical coupling arrangement to the module which includes the transcribe deck.

In accordance with one aspect of this invention, an intermediate module may be coupled between the aforementioned one module and the module which includes the transcribe deck. In this configuration, audio signals and function control signals pass through the intermediate module between the transcribe apparatus and the transcribe deck.

As a feature of the present invention, the aforementioned selector switch in each module which selects one or the other of the decks therein to operate in a transcribe mode is ganged with a connecting switch that is used to establish a path to one or the other decks therein or to another module connected thereto.

As another feature of this invention, the electrical coupling arrangement between the modules includes an input connector and an output connector at each module, the input connector of one being electrically coupled to the output connector of a preceding module. A path thus extends from the output connector of one module to the input connector of the next-following module, and thence through the aforementioned connecting switch to one or the other decks in that following module, or to the output connector for further coupling to a succeeding module. Thus, although transcribe apparatus may be connected merely to the first of several cascaded modules, any record/playback deck in a module downstream of that first module may be controlled as a transcription unit when that transcribe apparatus is operated. No disconnection and subsequent reconnection of the transcribe apparatus is needed to effect transcription from any other module.

BRIEF DESCRIPTION OF THE DRAWINGS

The following detailed description, given by way of example and not intended to limit the present invention solely to the embodiments described and illustrated herein, will best be understood in conjunction with the accompanying drawings in which.

DETAILED DESCRIPTION OF CERTAIN PREFERRED EMBODIMENTS

Figure 1:
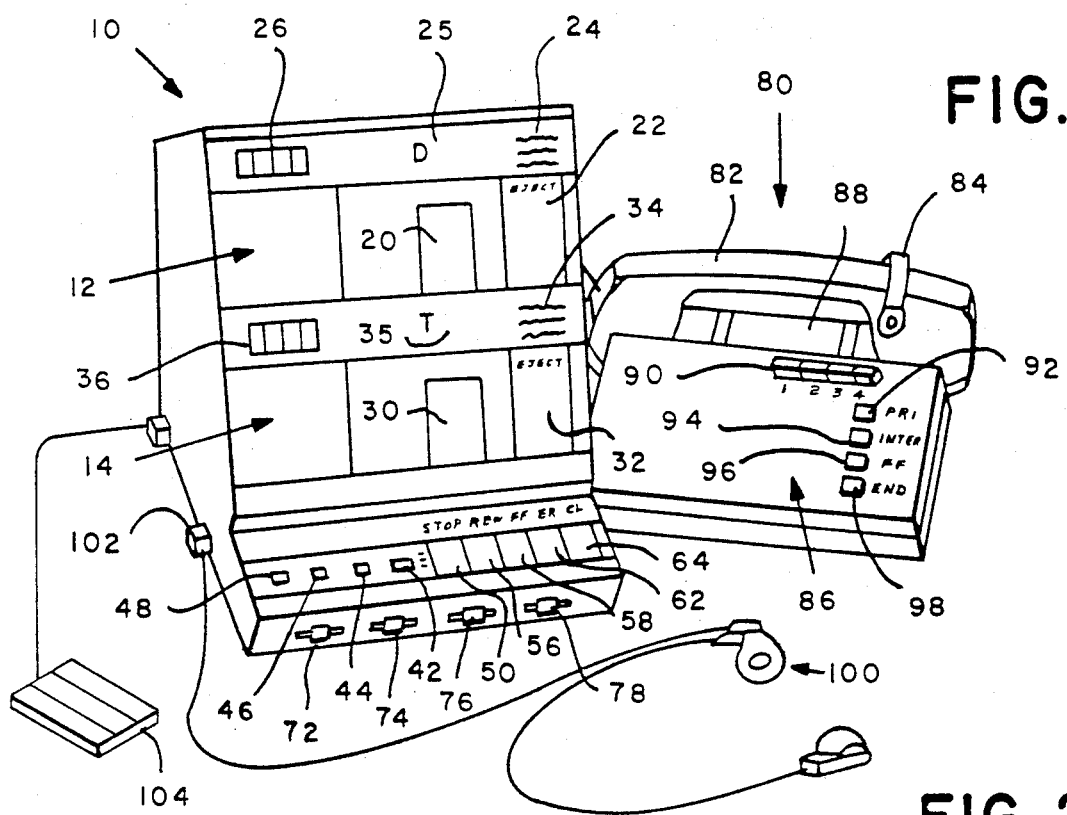
FIG. 1 is a perspective view of the dictate/transcribe module with which the present invention finds ready application.

Referring now to the drawings, and in particular to FIG. 1, there is illustrated one embodiment of a dictation system 10, referred to hereinafter as a dictate/transcribe module, in which the present invention finds ready application. Module 10 is comprised of two recording units, referred to as record/playback decks, 12 and 14 of substantially identical construction, these decks being supported one atop the other in a common console or housing. Each deck is provided with record/playback mechanisms and electronics of conventional construction for the purpose of recording dictation on and playing back dictation from a record medium. Preferably, the record medium is a magnetic tape housed in a cassette, such as a standard cassette, a mini-cassette, a microcassette or a picocassette, all as mentioned above. In an alternative embodiment, the record medium may comprise a solid-state storage device in which dictation is stored in digital form. For convenience, and in order to simplify the present explanation, the record medium is referred to herein as a cassette or a magnetic tape; but it will be appreciated that the aforementioned solid-state digital storage device also is contemplated.

Deck 12 includes a cassette compartment 20 for receiving a cassette and for positioning that cassette in proper disposition with respect to forward/rewind drive elements, a record/playback head, an erase head, a capstan and a pinch roller. The cassette compartment is protected by a door that is opened in response to the manual actuation of an EJECT button 22. Deck 14 includes a similar cassette compartment 30 protected by a door that is opened in response to the operation of an EJECT button 32.

Deck 12 also is provided with an operation display 24, a mode display 25 and a numerical display 26. Likewise, deck 14 is provided with an operation display 34, a mode display 35 and a numerical display 36. In both decks, the operation display 24, 34 indicates the particular operation being carried out on a cassette utilized by the deck. For example, the operation display may indicate when a cassette is "in use", that is, when a remote dictate station is connected to that deck for the purpose of recording dictation on the cassette utilized therewith. The operation display also is provided with an "end zone" indicator which is energized (or illuminated) when a predetermined amount of magnetic tape remains available for recording. For example, if a cassette is adapted to record thirty minutes of dictation, the end zone indicator is illuminated when only three minutes of tape remains available for recording. Other indications may be provided to apprise the user of the condition that the cassette on which dictation is being recorded soon will reach the end of its tape.

Operation display 24, 34 also includes an "operator" indicator which is illuminated when the attention of a supervisory operator is needed. For example, when dictation is recorded on a cassette that has been advanced to its very end, the "operator" indicator is illuminated. This indicator also may be illuminated when, for example, a cassette having a tape fault condition (e.g. the tape therein is jammed or broken) has been loaded into the deck, or the deck has been selected for transcription or for dictation but a cassette has not been loaded therein. Other conditions requiring the attention of a supervisory operator also may be indicated by the illumination of this "operator" indicator.

In the preferred embodiment, the respective indicators which comprise operation display 24, 34 may include LED's, LCD's or other visual indicators known to those of ordinary skill in the art.

Each deck 12, 14 also is provided with a mode display 25, 35, respectively, formed of LED's, LCD's, or the like to provide visual indications of the particular mode of operation that has been selected for the respective deck. For example, when the deck has been selected for and is enabled to operate in a dictation recording mode, the mode display may illuminate the letter "D" to indicate that the deck is enabled to record dictation. Alternatively, if the deck is selected to operate as a transcription unit, the mode display may illuminate the letter "T" to indicate such transcription operation. Still further, the mode display may include an "off line" indicator which is illuminated when the deck is in a non-operating mode in which neither dictation on nor transcription from that unit may be effected. The mode display also may include identifying indicators to identify the recording unit as unit "1", "2" or "3" in a multi-unit recording system, as described in greater detail in co-pending application Ser. No. 771,298.

Record/playback decks 12 and 14 also are provided with numerical displays 26 and 36, respectively, formed of four digit LED or LCD displays (or the like) which indicate the length of dictation that has been recorded on or transcribed from a cassette. This indication may be in terms of minutes and tenths of minutes, wherein, for example, a display of "035" represents three minutes and thirty seconds of dictation. When the deck is operated as a transcription unit, the numerical display indicates the approximate number of lines of typewritten material that await transcription in a particular message, letter, or the like. The numerical display also may display, as a first digit, the letter "P" which indicates the recording of a priority message. A message of superior importance which should be transcribed quickly is indicated by this prefix "P". This prefix "P" may be displayed alternately with a numeral which represents the number of priority messages remaining for transcription on the tape. The remaining three digits represent the approximate number of typewritten lines in the message awaiting transcription. As is explained in the aforementioned application, a "priority" message is represented by a special prefix code that is recorded on the tape itself, this code being sensed by the record/transcribe electronics included in dictate/transcribe module 10.

Dictate/transcribe module 10, as illustrated in FIG. 1, is provided with a single keyboard that may be operated either in conjunction with deck 12 or in conjunction with deck 14. A unit selector switch 42 is provided for selecting the desired deck to be operated. For example, when selector switch 42 is disposed in its first condition, that is, when the selector switch is moved to its upper position, deck 12 is selected for operation. This deck then may be operated in accordance with the operation of function control switches 50, 56, 58, 62 and 64, as will be described. Conversely, when unit selector switch 42 is disposed in its second condition, that is, when the selector switch is moved to its lowermost position, deck 14 is enabled for operation in response to the actuation of the aforementioned function control switches. Unit selector switch 42 preferably includes a third condition, corresponding to its center position, which is used to select deck 12 or deck 14 for operation as a dictation unit. More particularly, if the unit selector switch is operated from its first condition to its third condition, deck 12 is selected for operation as a dictation unit, provided that other initializing parameters are established, as will be described. Conversely, if the unit selector switch is operated from its second condition to its third condition, deck 14 is selected for operation as a dictation unit, provided the aforementioned initializing parameters have been established.

Dictate/transcribe module 10 also includes a remote/local selector switch 44 which is adapted to connect matching impedances within the module to be compatible with transcribe apparatus that is connected directly to the module or with transcribe apparatus that is disposed at a remote location and that is connected to the module via telephone lines, private wire lines, or the like.

A cassette speed selector switch 46 also is provided, this switch being selectively operable by the user of dictate/transcribe module 10 to select the appropriate record/playback speed of the magnetic tape upon which dictation is recorded and played back. Typically, the magnetic tape is advanced at a speed of approximately 2.4 cm per second in a microcassette upon which thirty minutes of dictation may be recorded. Alternatively, and for extended play, the record/playback speed may be established at approximately 1.2 cm per second, resulting in a capacity of sixty minutes of dictation. Cassette speed selector switch 46 is operable to select the lower or higher cassette speed, depending upon whether extended capacity is desired. It has been found, generally, that the fidelity of recorded dictation is somewhat reduced when the cassette is operated at its slower speed.

Dictate/transcribe module 10 also is provided with speaker/headset selector switch 48. Although not shown and described in detail herein, it will be appreciated that module 10 includes an integral loudspeaker which may be connected, via suitable electronics, to the playback head of deck 12 or deck 14, depending upon whether unit selector switch 42 is disposed in its first or second condition, respectively. Reproduced audio sounds are played back via this integral speaker when speaker/headset selector switch 48 is operated to select the integral speaker for reproducing such sounds. The module also includes a suitable jack to which a headset 100 is connected by means of a plug 102, and this headset is connected, via a connecting switch (to be described) and suitable electronics, to the playback head of deck 12 or deck 14 in the event that speaker/headset selector switch 48 has been operated to select the headset (rather than the speaker) for the reproduction of audible sounds.

The function control switches included in dictate/transcribe module 10 include a STOP switch 50. This switch is manually operable to establish a "stop", or quiescent, mode of operation for the module. Typically, switch 50 may be operated to terminate a fast-forward or rewind mode of operation which, in turn, may be selected by the operation of REWIND switch 56 or FAST-FORWARD switch 58. The STOP switch also is operable to quiet an audible warning sound or alarm that may sound at module 10.

REWIND switch 56 is adapted, when operated, to select a rewind operating mode for deck 12 or deck 14, depending upon whether unit selector switch 42 exhibits its first or second condition, as mentioned above. Likewise, the actuation of FAST-FORWARD switch 58 selects a fast forward mode of operation for the selected deck. When a deck is selected for operation as a transcription unit, the actuation of REWIND switch 56 functions to rewind the magnetic tape while scanning that tape for the occurrence of signals representing the ends of messages that had been dictated. Dictate/transcribe module 10 includes one or more microprocessors which, when supplied with so-called "chopper pulses" that are generated as the magnetic tape is moved, responds to the occurrence of the end-of-message signals to determine the location and length of each message. Depending upon whether deck 12 or deck 14 has been selected as a transcription unit, numerical display 26 or 36 indicates the length of the particular message then in position for transcription.

When FAST-FORWARD switch 58 is actuated, the magnetic tape provided in the record/playback deck which has been selected as a transcription unit is "searched" for access to "priority" messages. When a priority message is encountered, as when a recorded priority code is detected, tape movement stops and playback of that message begins within a predetermined time (e. g. a few seconds). If no "priority" messages had been recorded on the tape, the first message which had been recorded will be played back. Preferably, FAST-FORWARD switch 58 is actuated after the magnetic tape has been fully rewound and scanned. The operation of FAST-FORWARD switch serves to rapidly advance the magnetic tape in the forward direction until the first "priority" message is reached. If no "priority" codes had been detected during the rewind operation, the actuation of FAST-FORWARD switch 58 serves merely to initiate the playback of the first message that had been recorded.

ERASE switch 62, when actuated simultaneously with the actuation of REWIND switch 56, serves to energize the erase head included in deck 12 (or deck 14, depending upon the condition of unit selector switch 42) to erase dictation which had been recorded previously on the magnetic tape in that unit. For enabling a desired record/playback deck to operate as a dictation unit, such "erasure" operation (i. e. the simultaneous operation of REWIND switch 56 and ERASE switch 62) serves to initialize the deck. In the absence of such initialization of the record/playback deck, that deck is inhibited from operating as a dictation unit.

A CLEAR switch 64 is provided for the purpose of erasing information stored in the display memory of dictate/transcribe module 10. Such information may represent the locations of previously recorded messages the lengths of such messages, the location of "priority" messages, and the like. The CLEAR switch should be actuated prior to transcribing a newly-loaded cassette, and this switch also should be actuated before a selected one of the record/playback decks is conditioned as a dictation unit. In this manner, information that had been derived from a previously recorded or transcribed cassette is cleared from the display memory and does not interfere with the display of new information derived from the cassette then being utilized.

Dictate/transcribe module 10 also is provided with additional controls 72, 74, 76 and 78. These controls are designated volume control 72, tone control 74, playback speed control 76 and backspace control 78. Each control is constructed as a slide switch and, in one embodiment, each such switch produces an analog voltage that is used to control, or establish, a desired volume, tone, playback speed or backspace, respectively. Alternatively, each slide switch may produce a discrete digital signal, depending upon its position, to establish a respective volume, tone, playback speed or backspace level. Thus, the magnitude of the audible sounds which are reproduced by the integral speaker of module 10 or by headset 100 is adjusted by the setting of volume control 72. Likewise, the tone of the reproduced audible sounds (i. e. the relative treble and base level thereof) is established by the setting of tone control 74. The speed at which the tape is moved during a transcription operation, that is, the incremental difference between the speed selected by cassette speed selector switch 46 and the actual playback speed, is set and adjusted by playback speed control 76. Finally, the incremental amount of backspace that is produced when, for example, a playback switch is released during transcription, is set and adjusted by means of backspace control 78.

In addition to headset 100, a conventional foot pedal switch 104 is connected to dictate/transcribe module 10 for the purpose of controlling, or selecting the operational functions of, deck 12 or deck 14, depending upon which deck has been selected by unit selector switch 42 for a transcription operation. Typically, the foot pedal switch includes a playback pedal, a rewind pedal and a fast-forward pedal, the selected operation of which initiates a corresponding operation of the selected record/playback deck. When the playback pedal is actuated, the release thereof effects a brief rewinding of the tape by an amount determined by the setting of backspace control 78. Consequently, upon the reactuation of the playback pedal, the last few words which had been played back previously are played back once again. As will be described below, when a plurality of modules 10 are electrically coupled to each other, the operation of foot pedal switch 104, although connected to one particular module, nevertheless controls the operation of the deck that has been selected as the transcribe unit, regardless of the module in which that deck is disposed.

Dictate/transcribe module 10 is connected by means of private wire connections or by means of telephone connections to one or more dictate stations 80. A suitable switch control (not shown) may be provided to interconnect dictate/transcribe module 10 with several dictate stations, the switch serving to permit only one dictate station to be connected to deck 12 or to deck 14, depending upon which of these decks had been selected as the dictation unit. Dictate station 80 is provided with a handset 82, similar to a conventional telephone handset to the extent that a microphone is provided at one end thereof and a speaker is provided at the other end to permit dictation to be transmitted to dictate/transcribe module 10 and to permit dictation to be audibly reproduced for review by the dictator. Handset 82 includes a dictate control switch 84, as is conventional in telephone-type dictate stations, this dictate control switch being operable to initiate a "record" mode and a review/play mode. Since the operation of dictate control switch 84 is conventional, further description thereof is not provided.

Dictate station 80 also is provided with a desk set 86 having a cradle 88 to receive handset 82. Preferably, cradle 88 includes a switch similar to a conventional telephone hook switch which indicates when handset 82 is "off-hook" or "on-hook". Desk set 86 also includes a unit selector switch 90 formed of, for example, four separate pushbutton switches 90-1, 90-2, 90-3 and 90-4. Each pushbutton switch, when actuated, and subject to the availability of a record/playback deck, connects dictate station 80 to a deck associated with a respective one of the pushbutton switches. In the embodiment wherein dictate/transcribe module 10 is provided with only two decks, pushbutton switches 90-1 and 90-2 select deck 12 or deck 14, respectively, for connection to dictate station 80. If a selected deck is "in use", that is, if that deck has been selected for operation as a transcription unit or if that deck already is connected to another dictate station, or if the selected deck is "off line", the operation of the unit selector switch is ineffective to establish a connection between dictate station 80 and the selected deck. Preferably, an "in use" indicator is provided with each unit selector switch to indicate to the user of dictate station 80 which record/playback decks are "in use", as aforementioned. Dictate station 80 may be used in conjunction with two dictate/transcribe modules (which provide four decks), and for this reason unit selector switch 90 is provided with four pushbutton switches to permit the dictate station to be connected to any one of such four decks. Those record/playback decks which are "in use" are indicated by respective "in use" visual indicators associated with respective ones of pushbutton switches 90-1, 90-2, 90-3 and 90-4.

In the embodiment wherein only a single dictate/transcribe module having two decks is provided, as illustrated in FIG. 1, unit selector switch 90 may be omitted or, alternatively, may have no effect upon the particular deck that is connected to dictate station 80 when handset 82 goes "off-hook". That is, suitable dictation system controls may be provided to connect the dictate station only to the one record/playback deck which has been selected for operation as the dictation unit, provided that dictation unit is not already in use. In the embodiment shown in FIG. 1, if both decks 12 and 14 are selected as dictation units, unit selector switch 90-1 may be operated to connect dictate station 80 to deck 12 and unit selector switch 90-2 may be operated to connect dictate station 80 to deck 14, provided such decks are not then "in use".

Desk set 86 also is provided with switches 92, 94, 96 and 98 which are adapted to be manually actuated to initiate the functions now to be described. PRIORITY switch 92, when actuated, serves to record the aforementioned priority code on the magnetic tape included in the record/playback deck to which dictate station 80 is connected. As an example, the priority code may comprise a predetermined number of bursts (e. g. two bursts) of a tone signal which, when detected, is identified as the beginning of a "priority" message.

INTERCOM switch 94, when actuated, serves to establish a simple communication connection between handset 82 and similar communication apparatus (e. g. a similar handset) located at the site of dictate/transcribe module 10. The dictator thus may communicate directly with the transcriptionist or a supervisory operator at that site.

FAST-FORWARD switch 96, when actuated, initiates a fast forward operation of the magnetic tape in the deck to which dictate station 80 is connected. The tape is driven in the fast-forward mode until the so-called "farthest advance" point (i. e. the point reached by a dictator prior to rewinding the tape) is reached.

END switch 98, when actuated, serves to record a predetermined tone signal on the magnetic tape. It is expected that END switch 98 will be actuated upon the completion of a message, such as a letter, and thus functions to record an end-of-message tone signal on the magnetic tape. This end-of-message tone signal is distinguished from a so-called "secrecy" tone signal that is recorded when handset 82 is returned to cradle 88 (i. e. when the handset is placed in its "on-hook" condition) to disconnect dictate station 80 from dictate/transcribe module 10. The recording of such a "secrecy" code is conventional in central dictation systems and serves to signify the completion of dictation by a dictator and prevents a subsequent dictator from effecting a rewind operation of the magnetic tape to access the message that had been recorded by the previous dictator. Such a "secrecy" code normally is recorded at the end of the last-dictated message and, hence, is analogous to the aforementioned end-of-message tone signal. However, the end-of-message tone signal, when detected, does not prevent the magnetic tape from being rewound further; and, thus, the detection of the end-of-message tone signal does not prevent the present dictator from reviewing his own previously recorded messages.

The manner in which dictate/transcribe module 10 operates to designate one or the other record/playback deck as a dictation unit, or to designate both decks as dictation units, or to designate only one of the decks as a transcription unit is described in the aforementioned copending application, which description is incorporated herein by reference. Dictate/transcribe module 10 is provided with one or more microprocessors which sense the operation of various ones of the selector and function control switches, such as foot pedal switch 104, to select the operational functions of the deck which has been selected by selector switch 42 to operate in the transcribe mode. It is appreciated that the audio signals which are played back by the record/playback head of the selected transcription unit are coupled to headset 100 (or to the loudspeaker of module 10) whereat audio sounds are reproduced.

Figure 2:
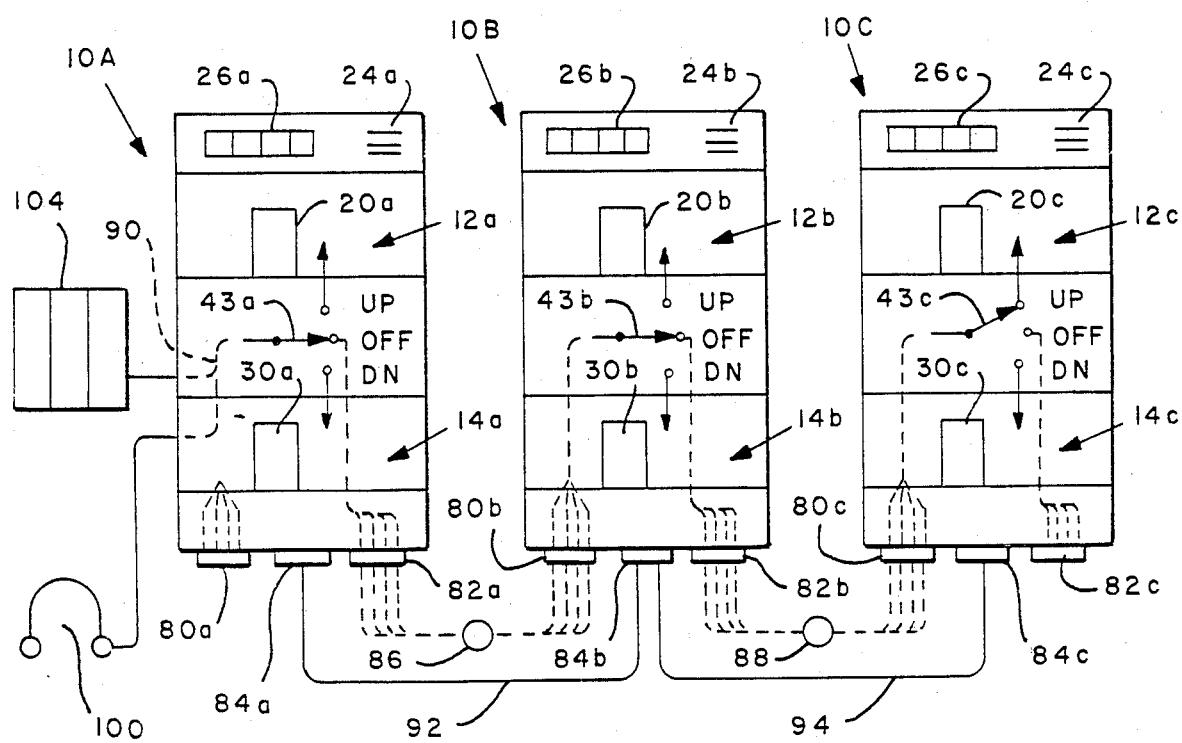
FIG. 2 is a schematic representation of interconnected modules, showing the manner in which transcribe apparatus is coupled therethrough to a selected transcription unit, in accordance with the present invention.

Turning now to FIG. 2, there is illustrated therein a schematic representation of a dictation system in which plural dictate/transcribe modules are interconnected. The same reference numerals are used in FIG. 2 as were used in FIG. 1 to identify similar components. For convenience, simplification and to facilitate an understanding of the present invention, FIG. 2 illustrates three interconnected modules identified as modules 10A, 10B and 10C, respectively. The modules are of substantially the same construction as mentioned above in connection with FIG. 1, and the reference numerals used in FIG. 2 have appended thereto the suffix "a", "b" and "c" to designate the particular module in which the components are located. To avoid duplicative discussion, those components which have been discussed above in conjunction with FIG. 1 merely are illustrated in FIG. 2 without further description herein.

Each dictate/transcribe module also is provided with an input connector 80, an output connector 82 and a power connector 84. Each input connector 80 is adapted to be coupled by means of a suitable plug/socket connection to a multi-conductor cable, such as a 4-conductor cable, for the purpose of receiving function control signals that control, or command, various operations of a record/playback deck for the purpose of effecting a transcribe operation. Preferably, such function control signals are produced by foot pedal switch 104 to command playback, rewind, fast-forward and stop operations, as mentioned above. The input connector also is adapted to pass audio signals which are reproduced by a playback head during a transcribe operation. As illustrated in FIG. 2, the input connector of one module is coupled by means of a multi-conductor transcribe coupling cable to the output connector of a preceding module. Thus, and as illustrated, input connector 80b is coupled to output connector 82a by transcribe coupling cable 86. Similarly, input connector 80c is coupled to output connector 82b by transcribe coupling 88.

In the preferred embodiment, only one of the cascaded modules 10A, 10B, . . . 10C need be connected directly to a suitable source of power, such as conventional AC mains. Power connectors 84a, 84b and 84c are interconnected by power coupling cables such that the power that is supplied directly to one of the cascaded modules is applied to the remaining modules. In the illustrated example, power coupling cable 92 is used to interconnect power connectors 84a and 84b; and power coupling cable 94 is used to interconnect power connectors 84b and 84c. Thus, if power is supplied directly to, for example, dictate/transcribe module 10A, power coupling cables 92 and 94 function to distribute that power to modules 10B and 10C, respectively. It will be appreciated that, if desired, additional modules may be cascaded to those illustrated in FIG. 2, and additional power coupling cables and transcribe coupling cables may be used to interconnect those additional modules as may be needed.

Each module also includes a connecting switch 43, illustrated in FIG. 2 as connecting switches 43a, 43b and 43c, respectively. The connecting switch in each module is ganged with selector switch 42 therein (refer to FIG. 1) for simultaneous operation. It will be seen that connecting switch 43 is provided with a movable contact and three fixed contacts, the latter fixed contacts being designated "UP", "OFF" and "DN", respectively. When selector switch 42 of a particular module selects, for example, deck 12 to function as a transcription unit, the movable contact of connecting switch 43 engages its "UP" contact. Conversely, when the selector switch is operated to select deck 14 as the transcription unit, the movable contact of connecting switch 43 engages its "DN" contact. Finally, when the selector switch is disposed at its nuetral position, whereby neither deck 12 nor deck 14 is selected as the transcription unit, the movable contact of connecting switch 43 engages its "OFF" contact. In each module, the "OFF" contact is connected by means of suitable conductors, shown in broken lines, to output connector 82. In this regard, it may be appreciated that the "OFF" contact may be constructed as multiple (e. g. four) individual contacts. Furthermore, each "UP" contact (or multiple contacts) is connected to suitable means provided in or associated with deck 12. Finally, the "DN" contact (or contacts) in each module is connected to suitable means in, or associated with, deck 14. Such means includes the playback head in each deck as well as the microprocessor (or microprocessors) which control the operation of the respective decks in a module in response to the function control signals supplied thereto. Such microprocessor-control over a record/playback deck to effect a transcribe operation is known to those of ordinary skill in the art and further description thereof is unnecessary for an understanding of the present invention.

Normally, the movable contact of connecting switch 43 is coupled, as by a multi-conductor cable, to input connector 80. This is particularly shown by the connection of input connector 80b to connecting switch 43b and by the connection between input connector 80c and connecting switch 43c. However, when headset 100 is connected to the module, such as shown in FIG. 1, the usual connection between the input connector and connecting switch 43 is interrupted. In place thereof, headset 100 now is connected to the connecting switch. Similarly, when foot pedal switch 104 is connected to the module, it too is connected directly to connecting switch 43. As shown in FIG. 2, headset 100 and foot pedal switch 104 are connected to dictate/transcribe module 10A, and as a result, the normal connection between input connector 80a and the movable contact of connecting switch 43a is interrupted. In place thereof, the headset and foot pedal switch are connected by transcribe connection 90 to the connecting switch. The manner in which circuit connections are opened and closed when a plug is inserted into a jack is well known to those of ordinary skill in the art and further explanation thereof need not be provided herein.

The operation of the cascaded modules illustrated in FIG. 2 now will be described. Let it be assumed that transcribe coupling cables 86 and 88 as well as power coupling cables 92 and 94 are used to interconnect modules 10A, 10B and 10C, as illustrated. Let it be further assumed that headset 100 and foot pedal switch 104 are connected to appropriate jacks provided in module 10A. Finally, let it assumed that connecting switches 43a and 43b both exhibit their neutral, or "OFF" positions by which the movable contact therein engages the fixed "OFF" contact. As a result of these switch conditions, a transmission path extends from headset 100 and foot pedal switch 104 via transcribe connection 90 to connecting switch 43a, and then through output connector 82a, transcribe coupling cable 86 and input connector 80b to connecting switch 43b, and thence from connecting switch 43b to output connector 82b, transcribe coupling cable 88 and input connector 80c to connecting switch 43c. Depending upon the selected condition of connecting switch 43c, the aforementioned transmission path extends either to deck 12c, to deck 14c or to output connector 82c. It is assumed herein that the movable contact of connecting switch 43c engages its "UP" contact and, thus, the transmission path extends to deck 12c in dictate/transcribe module 10C. Consequently, the operation of foot pedal switch 104 by an operator results in the transmission of corresponding function control signals from the foot pedal switch over the illustrated transmission path including transcribe connection 90, connecting switch 43a, transcribe coupling cable 86, connecting switch 43b, transcribe coupling cable 88 and connecting switch 43c to deck 12c. It is appreciated that these function control signals preferably are supplied to the microprocessor which is used with deck 12c, whereupon the commanded operation is carried out. Thus, the tape from which previously recorded dictation is transcribed is driven (e. g. in play, rewind or fast-forward directions) and the audio signals recorded thereon are played back. The recovered audio signals are transmitted back to headset 100 over the aforementioned transmission path, from the playback head through connecting switch 43c, through transcribe coupling cables 88 and 86, through connecting switch 43a and through transcribe connection 90 to the headset. Thus, the operator perceives reproduced audio sound from deck 12c which now is operating in a transcribe mode.

If deck 14c is selected to operate in the transcribe mode, as when selector switch 42 (FIG. 1) is operated accordingly, the movable contact of connecting switch 43c engages its "DN" contact so as to couple deck 14c to the illustrated transmission path.

Let it now be assumed that selector switch 42 included in module 10B is operated to select deck 12b for operation in the transcribe mode. The movable contact of connecting switch 43b now engages its "UP" contact, whereupon the transmission path extends merely to deck 12b. The transmission path which had extended from connecting switch 43b to output connector 82b and to transcribe coupling cable 88 now is interrupted. The operation of foot pedal switch 104 now controls the tape included in deck 12b to carry out a transcribe operation; and the audio signals reproduced from the playback head included in this deck are transmitted back to headset 100 via connecting switch 43b, input connector 80b, transcribe coupling 86, output connector 82b, connecting switch 43a and transcribe connection 90. Alternatively, if selector switch 42 included in module 10B selects deck 14b for operation in the transcribe mode, the function control signals generated by foot pedal switch 104 are supplied to this deck.

As yet a further example, let it be assumed that selector switch 42 included in module 10A is operated to select deck 12a (or deck 14a) for operation in the transcribe mode. As a result, the movable contact of connecting switch 43a engages its "UP" contact (or its "DN" contact), thus interrupting the transmission path that had extended previously from connecting switch 43a to output connector 82a and transcribe coupling cable 86. With this condition of selector switch 42 and connecting switch 43a, deck 12a (or deck 14a) is controlled to carry out a transcribe operation; and the audio signals which are reproduced by the playback head included in this deck are supplied via connecting switch 43a and transcribe connection 90 to headset 100.

Thus, it will be appreciated that, depending upon the particular position, or condition, of connecting switch 43 included in module 10A, 10B or 10C, record/playback deck 12 or deck 14 included therein may be operated as a transcription unit with the resultant audio signals derived by that deck being supplied to headset 100 even though this headset and foot pedal switch 104 are connected to module 10A. However, the transmission path which extends from the headset and foot pedal switch through the respective modules to a selected deck will be interrupted if connecting switch 43 upstream of the module in which that selected deck is disposed is changed over from its "OFF" position to its "UP" or "DN" position. For example, module 10B, which is illustrated herein as an intermediate module which is used to intercouple modules 10A and 10C, will interrupt the transmission path which extends from module 10A to module 10C if the movable contact of connecting switch 43b engages either its "UP" or "DN" contact. Similarly, the transmission path which extends from module 10A to module 10B is interrupted in the event that the movable contact of connecting switch 43a engages its "UP" or "DN" contact. The coupling arrangement which extends from headset 100 and foot pedal switch 104 through the cascaded decks is connected to the one deck determined by the particular conditions of connecting switches 43a, 43b, . . . 43c. Whereas selector switch 42 included in a particular module operates to determine which of the decks included therein should operate as a transcription unit, connecting switch 43 included in that same module effectively connects the selected deck to the transmission path which extends thereto from the headset and foot pedal switch. Also, it is recognized that connecting switch 43 serves to interconnect the input and output connectors 80 and 82 of a particular module when the movable contact of the connecting switch engages its "OFF" contact.

While the present invention has been particularly shown and described with reference to a preferred embodiment, it will be readily appreciated by those of ordinary skill in the art that various changes and modifications may be made without departing from the spirit and scope of the invention. For example, a greater number of modules may be cascaded in the manner represented in FIG. 2. Also, each module may include a greater or lesser number of record/playback decks therein. It will be appreciated that each connecting switch included in a module should be provided with a respective contact (or multiple contacts) for each deck included in that module as well as an additional contact by which the module may be coupled in cascade to a further module. Additionally, although the foregoing has described the connection of function control signals to a deck which has been selected for transcribe operation, it will be appreciated that the present invention contemplates the connection of such function control signals to the microprocessor which may be used to control the operation of that deck. It is intended that the appended claims be interpreted as including the foregoing as well as other changes and modifications.

What is claimed is:

1. Dictate/transcribe apparatus comprising plural modules, each module including at least two record/playback decks and switch means operable to select one or the other or neither of said decks to operate in a transcribe mode; transducer means connected to one of said modules to reproduce audio sounds from a deck operating in a transcribe mode; operation selecting means connected to said one module for selecting operational functions of said deck operating in said transcribe mode; and electrical coupling means for sequentially coupling said modules, and for transmitting audio signals from one of said decks selected to operate in in said transcribe mode through said electrical coupling means to said one module for reproduction as audio sounds by said transducer means, and for transmitting function control signals from said operation selecting means to said one module and thence through said electrical coupling means to said deck selected to operate in said transcribe mode.

2. The apparatus of claim 1 wherein said electrical coupling means couples said one module to at least one intermediate module and said at least one intermediate module to a module which includes said deck selected to operate in said transcribe mode, whereby said audio signals pass from said selected deck to said at least one intermediate module and thence to said one module and to said transducer means, and said function control signals pass from said operation selecting means to said one module and thence to said at least one intermediate module and to said module which includes said deck selected to operate in said transcribe mode.

3. The apparatus of claim 2 wherein said switch means in the at least one intermediate module includes means for connecting the electrical coupling means between the preceding and next-following modules, provided that said switch means selects neither of the decks in said at least one intermediate module to operate in the transcribe mode.

4. The apparatus of claim 2 wherein said switch means in each module includes means for connecting the electrical coupling means to the deck therein that has been selected to operate in said transcribe mode.

5. The apparatus of claim 1 wherein each module further includes connecting means ganged with said switch means for connecting said coupling means therethrough when said switch means selects neither of said decks in said module to operate in the transcribe mode and for connecting the coupling means to the deck in said module which has been selected by said switch means to operate in the transcribe mode.

6. Dictate/transcribe apparatus comprising at least first and second modules, each module including at least two record/playback decks for recording dictation on and reproducing dictation from a record medium, switch means for selecting one or the other or neither deck in a module as a transcribe deck, power connecting means for receiving and passing on electrical power supplied to a module, an input connector and an output connector wherein said dictate/transcibe apparatus further comprises; transducer means connected to said first module to reproduce audio sounds from a transcribe deck; transcribe control means connected to said first module for controlling the operation of a transcribe deck; power coupling means for interconnecting the power connecting means of said first and second modules; transcribe coupling means for connecting said output connector of said first module to said input connector of said second module; and selecting means included in each module and ganged with said switch means for interconnecting said input and output connectors therein when said switch means selects neither deck in said module as a transcribe deck; whereby dictation reproduced from a transcribe deck in said second module is supplied from the input connector of said second module to the output connector of said first module and thence to said transducer means, and transcribe control signals from said transcribe control means are supplied to said first module and thence from said output connector of said first module to said input connector of said second module for controlling said transcribe deck.

7. The apparatus of claim 6 further comprising a third module including at least two record/playback decks, switch means, power connecting means, an input connector, an output connector and selecting means; said power connecting means of said third module being interconnected by said power coupling means between said first and second modules, said input connector of said third module being connected by said transcribe coupling means to said output connector of said first module and said output connector of said third module being connected by said transcribe coupling means to said input connector of said second module; whereby said selecting means in said third module enables reproduced dictation and transcribe control signals to be coupled between said first and second modules if the switch means in said third module selects neither deck therein as a transcribe deck.

8. The apparatus of claim 7 wherein said selecting means in said third module enables reproduced dictation and transcribe control signals to be coupled between said first module and one of said record/playback decks in said third module when the switch means in said third module selects said one deck as a transcribe deck.

9. The apparatus of claim 7 wherein said selecting means in said first module enables reproduced dictation and transcribe control signals to be coupled between said transducer means and transcribe control means and one of said record/playback decks in said first module when the switch means in said first module selects said one deck as a transcribe deck.

10. The apparatus of claim 6 wherein said selecting means in each module exhibits at least a first state to connect the input connector therein to the output connector therein for enabling reproduced dictation and transcribe control signals to pass through that module, and a second state to connect the input connector therein with the deck selected as a transcribe deck for enabling reproduced dictation and transcribe control signals to be coupled between the selected deck and the input connector in that module.

* * * * *